United States Patent
Gürtler et al.

(10) Patent No.: US 7,205,356 B2
(45) Date of Patent: *Apr. 17, 2007

(54) 2-K PU SYSTEMS

(75) Inventors: Christoph Gürtler, Köln (DE); Raul Pires, Köln (DE); Heinrich Dornbusch, Duisburg (DE)

(73) Assignee: Bayer Materialscience AG, Leverkusen (DE)

( * ) Notice: Subject to any disclaimer, the term of this patent is extended or adjusted under 35 U.S.C. 154(b) by 336 days.

This patent is subject to a terminal disclaimer.

(21) Appl. No.: 10/780,857

(22) Filed: Feb. 18, 2004

(65) Prior Publication Data

US 2004/0220326 A1    Nov. 4, 2004

(30) Foreign Application Priority Data

Feb. 26, 2003    (DE) ................ 103 08 106

(51) Int. Cl.
*C08J 3/00* (2006.01)
*C08K 3/20* (2006.01)
*C08L 75/00* (2006.01)
*C08G 18/08* (2006.01)
*B32B 17/00* (2006.01)

(52) U.S. Cl. .............. 524/590; 524/589; 524/591; 524/839; 524/840; 528/44; 528/55; 528/56; 428/423.1

(58) Field of Classification Search ........... 524/589, 524/590, 591, 839, 840; 528/44, 55, 56; 428/423.1

See application file for complete search history.

(56) References Cited

U.S. PATENT DOCUMENTS

| 2,916,464 | A |   | 12/1959 | Ebnath et al. ........... 260/2.5 |
| 3,211,674 | A | * | 10/1965 | Sandridge .............. 521/160 |
| 3,674,716 | A |   | 7/1972 | Dijkhuizen et al. .... 260/2.5 AB |
| 5,252,696 | A |   | 10/1993 | Laas et al. ............... 528/49 |
| 5,846,897 | A |   | 12/1998 | Blank et al. ............. 502/150 |
| 5,914,383 | A |   | 6/1999 | Richter et al. .......... 528/59 |
| 5,965,686 | A |   | 10/1999 | Blank et al. ............. 528/56 |
| 6,090,939 | A |   | 7/2000 | Richter et al. .......... 544/67 |
| 6,107,484 | A |   | 8/2000 | Richter et al. .......... 544/67 |
| 6,353,057 | B1 |  | 3/2002 | He et al. ................ 525/124 |
| 6,426,414 | B1 |  | 7/2002 | Laas et al. ............... 544/222 |

FOREIGN PATENT DOCUMENTS

| CA | 2 408 723 | 11/2002 |
| DE | 100 07 821 | 8/2001 |
| WO | 00/34398 | 6/2000 |

OTHER PUBLICATIONS

Journal of Coatings Technology, vol. 74, No. 930, Jul. 2002, pp. 31-36, Z. Alex He et al, "A Selective Catalyst for Two-Component Waterborne Polyurethane Coatings".

Progress in Organic Coatings, 35, (month unavailable) 1999, pp. 19-29, Werner J. Blank et al, "Catalysis of the isocyanate-hydroxyl reaction by *non*-tin catalysts".

Polyurethanes Chemistry and Technology, High Polymers, Saunders & Frisch, vol. XVI, (month unavailable) 1962, p. 169, Kinetics and Catalysis of Reactions.

Paint and Coatings Industry, Oct. 16, 2000, pp. 80, 82, 83, 84, 86, 88, 90, 92, and 94, John Florio, "Metal Catalyzed Urethane Systems".

* cited by examiner

*Primary Examiner*—Patrick D. Niland
(74) *Attorney, Agent, or Firm*—Joseph C. Gil; Robert S. Klemz

(57) ABSTRACT

Catalysts for the accelerated curing of polyisocyanates with polyols, and to polyurethane systems comprising these. The catalysts are used in a two-component coating system based on polyurethanes including (a) polyisocyanates, (b) compounds having groups which are reactive with isocyanates, in water and optionally in the presence of organic solvents or solvent mixtures, (c) one or more compounds of elements of Group VB or Group VIB of the Periodic Table, in which the element in each case has an oxidation state of at least +4, and (d) optionally further additives and auxiliary agents. The coating systems are used in lacquers, paints and adhesives.

20 Claims, No Drawings

2-K PU SYSTEMS

CROSS REFERENCE TO RELATED PATENT APPLICATION

The present patent application claims the right of priority under 35 U.S.C. §119 (a)–(d) of German Patent Application No.103 08 106.2, filed Feb. 26, 2003.

FIELD OF THE INVENTION

The present invention relates to catalysts for the accelerated curing of polyisocyanates with polyols and to polyurethane systems which comprise these. The present invention relates specifically to catalysts for the accelerated curing of polyisocyanates with polyols in the presence of the solvent water (so-called water-based two-component polyurethane lacquers, 2-K PU water-based lacquers).

BACKGROUND OF THE INVENTION

The use of water as a solvent for lacquer applications has increased greatly in recent years. A deciding factor in the development of this technique is the role played by environmental considerations. For instance, this technique enables the use of organic solvents for the application of the lacquer to the substrate to be reduced greatly. A marked reduction in the emission of volatile constituents (so-called VOCs, volatile organic compounds) which favour ozone destruction and improved working conditions for users are associated with this. It is furthermore possible largely to dispense with the combustion of exhaust air from lacquering installations, resulting in cost savings.

For conventional lacquer systems, that is to say lacquer systems with which organic solvents are used for the application of lacquers to the substrate which is to be lacquered, a range of catalysts have been described which accelerate the reaction of (poly)ols with (poly)isocyanates to form polyurethanes. Depending on the desired working life, a catalyst having a reactivity which is suitable in each case can be selected in order to adjust the desired lacquer properties in accelerated manner. Catalysts based on tin compounds, in particular based on tin(IV) compounds, are among the catalysts which are typically used. Dibutyltin dilaurate, DBTL, is particularly preferred here. This compound is probably the most frequently used catalyst for so-called two-component polyurethane (2-K PU) lacquer applications. Tin salts or organotin compounds lead to the rapid reaction of isocyanates with alcohols or polyols. Alternatively, bismuth compounds and zinc compounds may also be utilised. These normally have a longer pot life and reaction time than the tin compounds. The use of zirconium chelates such as zirconium(IV) acetylacetonate has also been described. These have been described in *Journal of Coatings Technology* 2002, 74(930), 31–36, inter alia. Florio in *Paint and Coatings Industry* 2002, 16, 80, for example, gives an up-to-date overview of common catalysts. However, other typical polyurethane catalysts such as, for example, iron(III) acetylacetonate or corresponding compounds of nickel or of cobalt are not considered for use in light-fast lacquers because these catalysts generally form coloured complexes.

By contrast with conventional, solvent-containing systems, when water is used as a solvent for lacquer applications additional considerations should also be taken into account. An overview of these problems is provided in W. Blank *Progress in Organic Coatings* 1999, 35, 19, for example, as well as in WO 98/41322 and the literature cited therein.

In these lacquer systems the relative reaction rate of the isocyanate with alcohols must be considered by comparison with the reaction rate with water. The reaction of isocyanates with water leads to the formation of carbamic acid derivatives which subsequently react off to form the underlying amine and carbon dioxide. The carbon dioxide which is formed can manifest itself in the film as blistering, adversely affecting the film quality. For this reason carbon dioxide formation is undesirable. An amine which can react off with free isocyanate to form ureas is released from the decarboxylated carbamic acids. Excessive urea formation in turn manifests itself in a reduction in the pot life of the system and typically in loss of surface gloss and deterioration in the lacquer properties following the lacquering operation.

The reaction of isocyanates with water is consequently undesirable on account of the secondary reactions and the rapid loss of properties. By contrast with the non-catalysed lacquering system, therefore, in order to avoid a deterioration in properties, the reaction of water with isocyanates should not be preferential. It is desirable that the reaction of (poly)ol with the isocyanate component is preferential.

Furthermore, prior art catalysts in general have only a finite life in water-based systems, that is to say the catalyst is hydrolysed with greater or lesser rapidity by the action of water. This is true to a particular extent in the case of the tin(IV) compounds such as DBTL, already mentioned, which are popularly used in conventional systems, or also in the case of bismuth carboxylates such as, for example, bismuth(III)-2-ethylhexanoate (K-Kat, King Industries, Norwalk, Conn., USA), as also described in WO 00/47642.

Moreover, most industrially used polyol components for water-based 2-K PU applications have available carboxyl groups (neutralised with tertiary amines) which serve to hydrophilise the binder, that is to say serve to enable the polyol component to be incorporated in water. As a result of complexing, these carboxyl groups may under certain circumstances cause an inhibition of the catalytic activity of organotin compounds utilised as catalysts for 2-K water-based systems. This applies to all highly charged Lewis acids such as, for example, titanium(IV) compounds, zirconium(IV) compounds, and like compounds. A catalyst which is to be universally usable with a multiplicity of hydrophilised polyisocyanates and hydrophilised binders cannot be permitted to exhibit these interactions with the hydrophilising agents.

Tin and zirconium compounds have been described recently as catalysts for 2-K water-based systems. According to WO 98/41322 zirconium(IV) acetylacetonate should contribute towards accelerated curing of the 2-component polyurethane lacquer film in water-based systems, without lacquer films obtained in this case being of lower quality as regards gloss and haze than in the non-catalysed case. However, WO 98/41322 gives only examples of lacquer systems which are based on conventional organic solvents. No examples of lacquers obtained by the reaction of hydrophilised binders (polyols) with hydrophilised polyisocyanates (therefore those in which account must be taken of an interaction between the hydrophilising agent and the catalyst) are indicated. The teaching of WO 98/41322 furthermore describes the addition of a complexing agent (acetylacetone) which, in order to set the catalysis in motion, must not volatilise until the lacquer film has been applied. This procedure is necessary in order to keep the activity of the catalyst to a minimum during the pot life. Without the use of this complexing agent the pot life would fall to an unacceptable, impracticable level. The complexing agent has the disadvantage that it constitutes an additional volatile organic component, leading to renewed environmental pollution and adversely affecting working conditions for the user.

The object of finding a catalyst for the acceleration of the reaction of isocyanates with alcohols or polyols in the presence of water or generally for accelerating the curing of water-based 2-K PU systems has therefore arisen. The general lacquer properties dependent on the working time should not suffer as a result of the utilisation of the catalyst, and the pot life should not be shortened. Ideally, the pot life is not influenced by the presence of the catalyst. The catalyst should be hydrolytically stable and should have sufficient activity while active substance quantities are yet very low. Account should also be taken of ecological and economic considerations (price).

SUMMARY OF THE INVENTION

The present invention is directed to a two-component coating system based on polyurethanes including (a) polyisocyanates which are optionally hydrophilised, (b) compounds having groups which are reactive with isocyanates, optionally hydrophilised, in water and optionally in the presence of organic solvents or solvent mixtures, (c) one or more compounds of elements of Group VB or Group VIB of the Periodic Table, in which the element in each case has an oxidation state of at least +4, and (d) optionally further additives and auxiliary agents. The quantities of (a)+(b) are from 20 to 99.9999 parts by weight, the quantity of (c) is from 0.0001 to 5 parts by weight, and the quantity of (d) is from 0 to 75 parts by weight, with the proviso that the sum of the parts by weight (a) to (d) is 100 based on the two-component coating system.

The present invention is also directed to a process for preparing the above-described coating system including introducing component (c) into components (a) or (b) during their respective preparation, or introducing component (c) into the mixture during the preparation of the system as ready-for-use, or adding component (c) to one or more components before the addition of additional water or solvent.

The present invention is further directed to lacquers, paints and adhesives that include the present two-component coating system and/or are prepared according to the above-described process. Additionally, the present invention is directed to substrates coated with the above-described coating system.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has surprisingly now been found that this object can be achieved with various compounds of elements in the 5th and 6th (sub-)groups of the Periodic Table, in which the element in each case has an oxidation state of at least +4. Compounds of the elements vanadium, niobium, tantalum, molybdenum, tungsten and tellurium in particular have proved to be suitable. Compounds of the elements vanadium, tantalum, molybdenum, tungsten and tellurium are preferably utilised, thus, for example, salts of molybdic acid such as the alkali metal salts of molybdic acid as well as the alkali metal salts of vanadic acid as well as tetraethylphos-phonium molybdate, magnesium molybdate, calcium molybdate, zinc molybdate, lithium tungstate, potassium tungstate, tungstic acid, ammonium tungstate, tungstophosphoric acid, sodium tellurite, sodium niobate and sodium tantalate. Molybdic acid, lithium molybdate, sodium molybdate, potassium molybdate, rubidium molybdate, cesium molybdate, tetramethylammonium molybdate, tetraethylammonium molybdate, molybdenyl acetylacetonate, molybdenum dioxide tetramethylheptadionate, sodium tungstate, potassium tellurite $K_2TeO_3$, lithium orthovanadate, lithium metavanadate and modifications thereof, sodium orthovanadate, sodium metavanadate as well as ammonium heptamolybdate are particularly suitable.

These compounds are active catalysts for the acceleration of the reaction of polyisocyanates with polyols in water, while not thereby shortening the working time (pot life). Further additives such as, for example, complexing agents are not necessary. Here, high-quality polyurethane lacquers are obtained, the quality of which is at least equivalent to that of the lacquer films which arise without catalysis.

The use of compounds of the elements in the $5^{th}$ and $6^{th}$ (sub-)groups of the Periodic Table in their higher oxidation states for the production of lacquer films in water-based lacquer systems by catalysis of the reaction of (poly)ols with (poly)isocyanates has not hitherto been known.

Effects of compounds of molybdenum, for example in oxidation state 6 (for example lithium molybdate and sodium molybdate), have already been described before in U.S. Pat. No. 2,916,464, however with these compounds polyurethane foams were prepared by reaction of a polyester polyol with toluene diisocyanate (TDI) in the presence of water. All the more surprising then that high-quality, blister-free, light-fast lacquer films, which precisely are not foams, can be produced with these catalysts.

Molybdenum compounds in a lower oxidation state have been mentioned in the context of polyurethanes in Saunders/Frisch: High Polymers, Vol. XVI (1962), p. 169). These molybdenum compounds are coloured and are unsuitable for light-fast coatings.

Compounds of tetravalent or pentavalent vanadium (for example vanadium oxide triethylate for the preparation of polyurethanes) (q.v. also DE-A 1 921 952) have been mentioned for the catalysis of the reactions of aromatic (poly)isocyanates with (poly)ols to form polyurethanes. DE-A 1 921 952, however, at the same time excludes the use of vanadium compounds in water-containing systems because of the tendency of the compounds to hydrolyse, and moreover describes only the vanadium oxide trialcoholates.

It has now been established that the curing time, or the time which a ready-applied 2-K PU water-based lacquer or a coating requires in order to acquire its end properties (for example pendulum hardness, drying), can by the addition of the indicated catalysts according to the invention be rendered shorter than it is in the non-catalysed case (see Examples). The coated article can therefore be used substantially sooner.

The acceleration of the curing reaction is also observed in pigmented systems such as, for example, white or red lacquers (see Examples 2 and 3). If necessary, the quantity of catalyst must be increased.

If a binder such as is described above is used, which is hydrophilised internally by carboxylate groups—as is normal in the case of water-based 2-K PU lacquer systems—no acceleration of the reaction of polyols with polyisocyanates takes place as a result of the previously indicated zirconium acetylacetonate compounds already described in the context of the catalysis of the (poly)isocyanate-(poly)ol reaction or other catalysts described in the aforementioned literature.

The present invention therefore provides two-component coating systems based on polyurethane, characterised in that they include
(a) polyisocyanates which are optionally hydrophilised,
(b) compounds having groups which are reactive with isocyanates, optionally hydrophilised, in water and optionally in the presence of organic solvents or solvent mixtures,
(c) one or more compounds of elements in the 5$^{th}$ and 6$^{th}$ (sub-)groups of the Periodic Table, in which the element in each case has an oxidation state of at least +4,
(d) optionally further additives and auxiliary agents, wherein the quantities of (a)+(b) are from 20 to 99.9999 parts by weight, the quantity of (c) is from 0.0001 to 5 parts by weight, the quantity of (d) is from 0 to 75 parts by weight, with the proviso that the sum of the parts by weight of the individual components (a) to (d) is 100.

Compounds of the elements vanadium, tantalum, molybdenum, tungsten and tellurium are preferably utilised as the compounds (c).

Molybdic acid, lithium molybdate, sodium molybdate, potassium molybdate, rubidium molybdate, cesium molybdate, tetramethylammonium molybdate, tetraethylammonium molybdate, molybdenyl acetylacetonate, molybdenum dioxide tetramethylheptadionate, sodium tungstate, potassium tellurite $K_2TeO_3$, lithium orthovanadate, lithium metavanadate and modifications thereof, sodium orthovanadate, sodium metavanadate as well as ammonium heptamolybdate are particularly preferably utilised as the compounds (c).

The two-component systems based on polyurethane are preferably constituted by water-based two-component lacquer systems.

The invention also provides a process for the preparation of the two-component polyurethane systems of the general composition (a) to (d), which is characterised in that the sequence in which the components of the lacquer system and the auxiliary substances (a) to (d) are added can be varied at will.

The invention also provides the use of the two-component polyurethane systems according to the invention for the manufacture of lacquers, paints and other systems such as adhesives or elastomers.

The invention also provides substrates coated with the 2-K PU systems according to the invention.

Two-component systems within the meaning of the present invention are understood to be coating compositions in which the components (a) and (b) must be stored in separate containers owing to their reactivity. The two components are not mixed until shortly before application and then generally react without additional activation.

The (poly)isocyanate component (a) is constituted by any organic polyisocyanates having aliphatically, cycloaliphatically, araliphatically and/or aromatically bound free isocyanate groups, which are liquid at room temperature or are diluted with solvents for this purpose. The polyisocyanate component (a) has a viscosity of from 10 to 15000, preferably 10 to 5000 mPa.s at 23° C. The polyisocyanate component (a) is particularly preferably constituted by polyisocyanates or poly-isocyanate mixtures having exclusively aliphatically and/or cycloaliphatically bound isocyanate groups of an (average) NCO functionality of between 2.0 and 5.0 and a viscosity of from 10 to 2000 mPa.s at 23° C.

Polyisocyanates having free NCO groups are preferably utilised as cross-linking agents, in order to obtain a particularly high-quality technical properties from the water-based two-component polyurethane lacquers. Polyisocyanates based on isophorone diisocyanate (IPDI), hexamethylene diisocyanate (HDI), 1,4-diisocyanatocyclohexane, bis-(4-isocyanatocyclohexyl) methane (Desmodur® W, Bayer AG, Leverkusen), 1,3-diisocyanatobenzene, 2,4- and/or 2,6-di-iso-cyanatotoluene (TDI), diisocyanatodiphenyl methane (MDI), as well as ω, ω'-diisocyanato-1,3-methylcyclohexane ($H_6XDI$) are, for example, suitable as such cross-linking resins. Polyisocyanates based on isophorone diisocyanate, hexamethylene diisocyanate, bis-(4-isocyanatocyclohexyl) methane and ω, ω'-diisocyanato-1,3-dimethylcyclohexane ($H_6XDI$) are preferred.

The diisocyanates indicated may optionally be used as such, however derivatives of the diisocyanates are generally used. Polyisocyanates comprising biuret, isocyanurate, uretdione, urethane, iminooxadiazine dione, oxadiazine trione, carbodiimide, acyl urea and allophanate groups are suitable as the derivatives. Preferred derivatives are those such as have isocyanurate, iminooxadiazine dione and uretdione structures. Low-monomer lacquer polyisocyanates having these structural elements prepared from isophorone diisocyanate (IPDI), hexamethylene diisocyanate (HDI), 1,4-diisocyanatocyclohexane, bis-(4-isocyanatocyclohexyl) methane (Desmodur® W) are particularly preferred.

Triisocyanates such as, for example, TIN (triisocyanatononane) are also suitable. The (poly)isocyanate component (a) may optionally be modified to be hydrophilic. Water-soluble or water-dispersible polyisocyanates are obtainable, for example, by modification with carboxylate, sulfonate and/or polyethylene oxide groups and/or polyethylene oxide/polypropylene oxide groups.

A hydrophilisation of the polyisocyanates is possible, for example by reaction with deficit quantities of monohydric, hydrophilic polyether alcohols. The preparation of such hydrophilised polyisocyanates is described, for example, in EP-A 0 540 985, p. 3, line 55-p. 4, line 5. The polyisocyanates which comprise allophanate groups, which are described in EP-A-0 959 087, p. 3, lines 39–51 and which are prepared by reaction of low-monomer polyisocyanates with polyethylene oxide polyether alcohols under allophanation conditions, are also eminently suitable. The water-dispersible polyisocyanate mixtures based on triisocyanatononane, which are described in DE-A 10 007 821, p. 2, line 66-p. 3, line 5, are also suitable, as well as polyisocyanates hydrophilised with ionic groups (sulfonate groups, phosphonate groups), such as are described, for example, in DE-A 10 024 624, p. 3, lines 13–33 or also in WO 01/88006. External hydrophilisation by the addition of emulsifiers is likewise possible.

The NCO content of the polyisocyanate component (a) which is used may, for example in the case of so-called polyether allophanates (hydrophilisation by means of a polyether), be from 5 to 25 wt. %. In the case of hydrophilisation with sulfonic acid groups, NCO contents of from 4 to 26 wt. % can be reached, these figures being intended to be understood only as examples.

The isocyanate components utilised may also in part be blocked, for example up to one-third of the isocyanate groups present, with components which are reactive to isocyahates. In this case, reaction of the blocked isocyanate component may take place with further polyol in a later step in order to bring about a further cross-linking.

Suitable blocking agents for these polyisocyanates are, for example, monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactam, phenols, amines such as diisopropylamine or dibutylamine, dimethyl pyrazole or triazole, as well as malonic acid dimethyl ester, malonic acid diethyl ester or malonic acid dibutyl ester.

The utilisation of low-viscosity, hydrophobic or hydrophilised polyisocyanates having free isocyanate groups based on aliphatic, cycloaliphatic, araliphatic and/or aromatic isocyanates, particularly preferably on aliphatic or cycloaliphatic isocyanates, is preferred, because in this way particularly high-quality properties of the lacquer film can be achieved. The advantages of the binder dispersions according to the invention emerge most clearly in combination with these cross-linking agents. These polyisocyanates generally have a viscosity of from 10 to 3500 mPa.s at 23° C. If necessary, the polyisocyanates may be utilised mixed with small quantities of inert solvents in order to reduce the viscosity to a value within the range indicated. Triisocyanatononane may also be utilised, alone or in mixtures, as a cross-linking component.

As a matter of principle, the utilisation of mixtures of different polyisocyanates is naturally also possible.

The following, for example, are suitable as compounds having groups (b) which are reactive with isocyanates: polymers of olefinically unsaturated monomers (so-called polyacrylate polyols), of combinations of diols and dicarboxylic acids (so-called polyester polyols), of combinations of diols, dicarboxylic acids and diisocyanates (so-called polyurethane polyols) and/or of hybrid systems prepared from the polyol classes indicated, for example polyacrylate-polyester polyols, polyacrylate-polyurethane polyols, polyester-polyurethane polyols or polyester-polyurethane polyols, which preferably have a molecular weight $M_n$ (number average), determinable by gel permeation chromatography, of 500 to 50000, in particular 1000 to 10000, a hydroxyl value of from 16.5 to 264, preferably 33 to 165 mg KOH/g solid resin, an acid value (in relation to the non-neutralised sulfonic acid groups and/or carboxyl groups) of from 0 to 150, preferably 0 to 100 mg KOH/g solid resin and a sulfonate group and/or carboxyl group content of from 5 to 417, preferably 24 to 278 milliequivalents per 100 g solids, having hydroxyl groups, sulfonate groups and/or carboxylate groups, preferably carboxylate groups and optionally sulfonic acid groups and/or carboxyl groups, preferably carboxyl groups.

These anionic groups are particularly preferably carboxylate groups. EP-A 0 959 115, p. 3, lines 26 to 54, for example, provides an overview of different binders. However, simple diol components may also be used. As a matter of principle, all binders which are dissolved or dispersed in water and which have groups which are reactive to isocyanates are suitable as the binder component (b). These also include, for example, polyurethanes or polyureas dispersed in water, which are cross-linkable with polyisocyanates owing to the active hydrogen atoms present in the urethane groups and urea groups respectively.

The binder component (b) is generally utilised in the preparation of the coating compositions in the form of from 10 to 60, preferably 20 to 50 wt. % aqueous solutions and/or dispersions, which generally have a viscosity of from 10 to $10^5$, preferably 100 to 10000 mPa.s/23° C., and pH values of from 5 to 10, preferably 6 to 9. Auxiliary solvents may optionally be co-used.

Dependent on the molecular weight of the binder component (b) and its anionic group or free acid group, in particular carboxyl group, content, the aqueous systems which comprise the polymers are constituted by true dispersions, colloidally dispersed or molecularly dispersed dispersions, generally however by "part dispersions", that is to say aqueous systems which are in part molecularly dispersed and in part colloidally dispersed.

The ratio of isocyanate groups to hydroxyl groups (NCO—OH ratio) may encompass a broad range. For instance, a ratio of from 0.2:1.0 to 4.0:1.0 is usable for lacquer applications. A range of from 0.35:1 to 2.0:1.0, is preferred, with 1.0:1.0 to 1.5:1.0 being particularly preferred.

Compounds of higher-valency molybdenum (from oxidation state +4 upwards) based on molybdenum dioxo compounds, such as are present, for example, in the compounds molybdenyl acetylacetonate, or simple molybdates such as sodium molybdate or potassium molybdates, are considered as the catalysts (c).

Suitable catalysts are consequently lithium molybdate, sodium molybdate, potassium molybdate, rubidium molybdate, cesium molybdate and other molybdate salts of monovalent, divalent or trivalent cations, as well as molybdate salts which have available an organic cation, such as, for example, ammonium, tetramethyl ammonium, tetraethyl phosphonium, and the like.

Lithium molybdate, sodium molybdate and molybdic acid are particularly suitable. Compounds of higher-valency vanadium (in oxidation state +5) based on vanadic acid, such as are present, for example, in the compounds sodium orthovanadate and lithium orthovanadate, are furthermore considered as catalysts according to the invention.

Suitable catalysts are consequently lithium vanadate, sodium vanadate, sodium orthovanadate, potassium vanadate, rubidium vanadate, cesium vanadate and other vanadate salts of monvalent, divalent or trivalent cations, as well as vanadate salts which have available an organic cation, such as, for example, ammonium, tetramethylammonium, tetraethylphosphonium.

Lithium orthovanadate, sodium orthovanadate and sodium metavanadate are particularly suitable.

The catalyst quantities to be utilised in respect of the molybdate and vanadate compounds are very low. In general, it is possible to work with a quantity of active substance of from 1 to 10000 ppm, a range of 1 to 5000 ppm is preferred, a range from 1 to 1000 ppm is particularly preferred. The effectiveness of the catalyst is independent of the manner of its addition. It may consequently be added in direct manner into the added water. Alternatively, it may also be incorporated into the components (a) and/or (b).

The conventional auxiliary agents and additives appropriate to lacquer technology (d), such as, for example, foam suppressants, thickeners, pigments, dispersing agents, further catalysts different from (c), anti-skinning agents, anti-sedimentation agents or emulsifiers may be added before, during or after the preparation of the aqueous binder dispersion according to the invention and also in the case in which the coating compositions are prepared by the addition of at least one cross-linking agent.

The two-component polyurethane systems according to the invention comprise as solvents water and optionally organic solvents or mixtures thereof.

All known solvents may be used as organic solvents. The solvents used in the lacquer industry such as xylene, butyl acetate, ethyl acetate, butyl glycol acetate, butoxyl, methoxypropyl acetate, hydrocarbons such as Solvesso® 100 (Exxon Mobile Chemicals) (alternatively solvent naphtha may also be used) or N-methylpyrrolidone, are preferred.

The organic solvents are utilised, if at all, only in the quantities that emerge as necessary. Thus, for example, in order to pre-dilute the polyisocyanates (a) which are utilised, or in the quantity that emerges as being required for the preparation of the binder component (b) dissolved or dispersed in water.

The lacquers, paints and other formulations are prepared from the two-component polyurethane systems according to the invention by methods which are known per se. Because of the consistency of the polyisocyanate component (a) and the binder component (b) which are utilised, a simple combining together of the components, with further use of components (c) and (d), followed by stirring-up or intermixing is as a matter of principle suitable for the preparation of the lacquer mixture. Depending on the raw materials utilised, a dissolver may, for example, be used for blending at higher stirring speeds (for example at 2000 r.p.m.). In a large number of cases simple stirring, for example with a rod, will suffice for the intermixing. Independently of the preparation method selected, the water-based 2-component polyurethane systems according to the invention comprise the individual components (a) to (d), which are described hereinabove, wherein the quantities of (a)+(b) may be from 20 to 99.9999 parts by weight, the quantity of (c) may be from 0.0001 to 5 parts by weight, and the quantity of (d) may be from 0 to 75 parts by weight, with the proviso that the sum of the parts by weight of the individual components (a) to (d) is 100 parts by weight.

The water-based coating compositions thus obtained are suitable for all areas of application in which water-based painting and coating systems are used which place high demands on the properties of the films, for example coating of mineral building material surfaces, lacquering and sealing of wood and wood materials, coating of metallic surfaces (metal coating), coating and lacquering of asphalt-containing or bitumen-containing coverings, lacquering and sealing of diverse plastics surfaces (plastics coating) as well as high-gloss lacquers and high-gloss top coat lacquers.

The water-based coating compositions comprising the binder dispersions are used for the manufacture of primers, fillers, pigmented top coat lacquers and clear coat lacquers as well as one-coat lacquers which are used in one-off and production line application, for example in the field of industrial lacquering, automotive original and repair lacquering.

Preferred uses of the water-based coatings according to the invention comprising the catalysts (c), particularly preferably the alkali metal salts of the molybdates, preferably in combination with polyisocyanates are the coating or lacquering of metallic surfaces or plastics or of floors at the conventional working temperatures, preferably room temperature to 140° C. These coatings have rapid drying with very good film appearance as well as reaching the film end properties rapidly, while simultaneously affording a high level of solvent and chemical resistance.

The coating may be produced by a very wide variety of spraying processes such as, for example, compressed air, HVLP, airless, air-mix or electrostatic spraying processes. The lacquers and coating compositions comprising the catalysts according to the invention may, however, also be applied by other methods, for example, by brushing, roller application or knife coating.

As could be demonstrated (q.v. Examples, Table 1), it is possible with the aid of the catalysts according to the invention to achieve the end properties of the lacquers or coatings investigated markedly more rapidly than is possible in the case without catalysis. The acceleration of curing relates not only to clear coat lacquers but also to (pigmented) top coat lacquers, water-based fillers, primers as well as further coatings such as, for example, highly filled floor coatings. The latter are shown in Table 2. In cases in which the top coat lacquer is pigmented, a marked acceleration of the curing of the lacquer also still results.

Examples are provided hereinbelow to demonstrate the effectiveness of the catalysts described.

EXAMPLES

As part of the investigations into the effectiveness of the catalysts for water-based 2-component polyurethane lacquer systems the development of hardness (pendulum hardness) of the lacquer films was determined in accordance with König/DIN 53157 dependent on the curing time. The chemical/solvent resistance and gloss of the lacquer films were additionally investigated. In the Examples the increased pendulum hardness of the lacquer films clearly shows the acceleration in curing.

Polyisocyanate Component (a) Utilised:

(a1) Bayhydur® VP LS 2319, hexamethylene diisocyanate trimer hydrophilised by a polyether radical, NCO content 18.0+/−0.5 wt. %, viscosity at 23° C. approx. 4,500 mPa.s, Bayer AG, Leverkusen. Produced as described in EP-A0959087.

(a2) Desmodur® XP 2410, non-hydrophilised polyisocyanate based on a hexamethylene diisocyanate trimer, NCO content 23 wt. %, viscosity at room temperature approx. 700 mPa.s, Bayer AG, Leverkusen. Produced as described in DE-A 19 611 849 (Examples 4 and 5, for example) and DE-A 19 824 485 (Example 3, for example).

(a3) Bayhydur® XP 2451 (hydrophilised hexamethylene diisocyanate tri- and dimerisation product, Bayer AG, Leverkusen) viscosity 1400 mPa.s, NCO content 18.8 wt. %.

Polyol Component (b) Utilised:

(b1) Bayhydrol® VP LS 2235-1, OH content of solid resin: 3.3 wt. %, polyacrylate polyol, Bayer AG, Leverkusen. The polyol is dispersed in water and has carboxyl groups for hydrophilisation.

(b2) PU-PAC polyol. Hybrid binder prepared from polyurethane (the PU-PAC dispersion is obtained from a polyurethane dispersion (hydrophilised with hydroxycarboxylic acid, following the addition of a diisocyanate, with formation of a prepolymer, followed by dispersion in water and chain lengthening by the addition of a diamine) by polymerisation of an acrylate in the PU dispersion).

Laboratory product RSC 1392, Bayer AG, Leverkusen. Directions for preparation: 99.2 g of a polyester prepared from 47 parts hexahydrophthalic acid anhydride and 53 parts 1,6-hexanediol, having an OH value of 53 and an acid value of less than 3, are heated to 80° C. together with 9.6 g 1,4-butanediol and 0.2 g tin(II) octoate and are held at this temperature until a homogeneous solution is present. 31.2 g Desmodur® W (Bayer AG, Leverkusen, Del.) are then added within 2 minutes, with stirring, the reaction mixture is heated to 140° C. and is stirred for 2 hours at 140° C. The prepolymer is dissolved by the addition of 46.7 g propylene glycol-n-butylether, and stirring takes place for a further 10 minutes. Within 2 hours a solution prepared from 105.2 g hydroxypropyl acrylate, 41.2 g styrene and 16.8 g 2-ethylhexyl acrylate is dispensed thereto. In parallel, a solution prepared from 24.0 g di-tert.-butyl peroxide and 24.0 g propylene glycol-n-butylether is added dropwise within 3.5 h. After the influx of solution 1 has ended, a mixture prepared from 38.8 g hydroxypropyl methacrylate, 19.6 g n-butyl acrylate, 8.6 g styrene and 5.0 g acrylic acid is dispensed-in directly within 1 h.

Following the addition of solution 2 the reaction mixture is stirred for a further 2 h at 140° C., then cooled to 100° C., 6.5 g dimethyl ethanolamine is added, and the mixture is homogenised for 10 min. Dispersion takes place by the addition of 529.3 g water within 5 minutes. A 39.3 wt. % dispersion is obtained having an OH content of 4.5 wt. % in respect of solid resin, whereof the particles have an average particle size of 173.3 nm. The hybrid resin has an average molecular weight $M_w$ of 21382 g/mol.

(b3) Hydrophilised polyester polyol. This is laboratory product WPC 19004, Bayer AG, Leverkusen.

Preparation of a water-dilutable polyester polyol: 334 g neopentyl glycol, 638 g 1,4-cyclohexane dimethanol, 733 g trimellitic acid anhydride and 432 g $\epsilon$-caprolactam are weighed together into a reactor which is equipped with a stirrer, heating, automatic temperature control, nitrogen inlet, column, water separator and receiver, and are heated, with stirring and with a nitrogen stream, to 230° C., such that the overhead temperature of the column does not exceed 103° C. The water of reaction separates thereby. Condensation takes place to an acid value of <5 mg KOH/g. The batch is then cooled to 150° C., and 870 g neopentyl glycol, 827 g trimethylolpropane and 1874 g phthalic acid anhydride are added. Heating to 220° C. then takes place, with stirring and with a nitrogen stream, such that the overhead temperature of the column does not exceed 103° C. Water of reaction continues to separate thereby. After distillation has ended the water separator is replaced by a distillation bridge, and stirring takes place at 220° C. until the overhead temperature of the column falls below 90° C. The column is removed, and condensation takes place with an increased nitrogen stream until the acid value is <5 mg KOH/g. Cooling then takes place to 140° C., 418 g trimellitic acid anhydride are added, and stirring takes place at 170° C. until such time as an acid value of approx. 35 mg KOH/g is obtained. Until this point in the preparation of the polyester, a total of approx. 1770 g polyester resin has been removed by taking samples and by further withdrawals. Cooling then takes place to 130° C., 210 g dipropylene glycol dimethyl ether are added and are dissolved-in at 100° C. for 1 hour. This resulting solution is then stirred within 1 hour at 50° C. into a mixture of 134 g N,N-dimethyl ethanolamine and 3174 g deionised water, which has been heated to 50° C. The resulting product is adjusted with further water to a solids content of approx. 47 wt. %. An opaque dispersion with a bluish lustre, having a solids content of 46.7 wt. % polyester polyol (measured as the non-volatile constituent on a sample in a forced air oven for 60 min. at 125° C.), an acid value of 16.3 mg KOH/g (in relation to the form in which it is supplied), an OH value of 116 mg KOH/g (in relation to solid resin) and a viscosity of 2306 mPa.s at 23° C. The dispersion comprises approx. 2.4 wt. % dipropylene glycol dimethyl ether, approx. 1.7 wt. % N,N-dimethyl ethanolamine and approx. 49.2 wt. % water. The product may be further diluted with water and is suitable for use in water-based two-component polyurethane lacquers.

(b4) Bayhydrol® XP 2457 (anionic polyacrylate polyol, water-dispersible, Bayer AG, Leverkusen): viscosity: 20–200 mPa.s, OH content 0.8 wt. %.

Catalyst Component (c) Utilised

The catalysts (c) were obtained from Aldrich and ABCR and were utilised without further modification in a 10% aqueous solution. The percentages and parts, respectively, indicated for the raw materials utilised are by weight.

Example 1

Influence of different molybdate salts on the curing behaviour of a water-based 2-K PU clear coat lacquer; Comparison Example 1a, Examples 1b-1h according to the invention.

TABLE 1

Formulation of a water-based 2-K PU clear coat lacquer

|  | parts by weight |
|---|---|
| Component 1 | |
| Polyol component (b1): | 400.0 |
| Bayhydrol ® VP LS 2235 | |
| Surfynol ® 104[1] | 9.1 |
| Borchigel ® PW 25[2] | 1.2 |
| Baysilone ® VP AI 3468[3] | 7.6 |
| Total component 1 | 417.9 |
| Component 2 | |
| Polyisocyanate component (a1): | 152.9 |
| Bayhydur ® VP LS 2319 (80 wt. % in | |
| methoxybutyl acetate) | |
| Total comp. 1 + comp. 2 | 570.8 |
| Ratio by weight comp. 1:comp. 2 | 100:36.6 |
| H₂O 25 sec. DIN 4 to 100.0 g | 45.6 |

[1]Air Products, N.L., additive to improve flow, wet the substrate, suppress foam,
[2]Borchers GmbH, Monheim, PU thickener,
[3]Borchers GmbH, Monheim, slip additive.

The catalysts (c) were obtained from Aldrich and ABCR and were utilised without further modification in a 10% aqueous solution. All components of the base (component 1) were mixed with one another and degassed. The lacquer components (components 1 and 2) were then mixed by means of a dissolver at 2000 r.p.m. for 2 minutes. The catalyst was added to the ready lacquer mixture before application and was then incorporated mechanically as described above. The lacquer film was knife coated onto a glass plate.

After curing, the pendulum hardness of the lacquer system was determined (damping of a pendulum through the lacquer surface; the higher the value, the better and the more complete the cure of the lacquer film).

TABLE 2

Results of investigation into the acceleration
of curing of a water-based 2-K PU clear coat
lacquer as a result of the addition of catalysts.

|  | Comparison | Examples according to the invention | | | | | | | | |
|---|---|---|---|---|---|---|---|---|---|---|
|  | 1a | 1b | 1c | 1d | 1d | 1e | 1f | 1g | 1h | 1i |
|  | No cat. | Mo AcAc | LiM | NaM | KM | RbM | CsM | TMAMM | NaW | KTe |
| Pendulum hardness in sec. After curing at 30 min./60° C. followed by: | | | | | | | | | | |
| 2 h RT | 28 | 65 | 70 | 66 | 66 | 62 | 65 | 66 | 36 | 49 |
| 1 d RT | 99 | 95 | 88 | 77 | 89 | 90 | 99 | 95 | 95 | 95 | d = day;
RT = room temperature
LiM = lithium molybdate,
NaM = sodium molybdate,
KM = potassium molybdate,
RbM = rubidium molybdate,
CsM = cesium molybdate,
TMAM = tetramethylammonium molybdate,
MoAcAc = molybdenyl acetylacetonate,
NaW = sodium tungstate,
KTe = potassium tellurite $K_2TeO_3$.
A catalyst quantity of 92 ppm catalyst to total solids was utilised.
This Example shows the acceleration of curing of the lacquer film (increase in pendulum hardness).
In the catalysed case, after two hours the pendulum hardness already reaches almost the final level,
which in the non-catalysed case is not reached until one day has elapsed.

Example 2

Preparation of a clear coat lacquer, catalyst sodium orthovanadate $Na_3VO_4$

Application conditions: 24° C./51% relative atmospheric humidity. Drying was for 30 mins. at 60° C.

Example 3

Preparation of a clear coat lacquer, catalyst rubidium molybdate $Rb_2MoO_4$; application conditions 24° C./47% atmospheric humidity.

Drying was for 30 minutes at 60° C. Lacquer composition:

|  | Comparison | Examples according to the invention | | | | | | | |
|---|---|---|---|---|---|---|---|---|---|
| Catalyst | None | Sodium orthovanadate $Na_3VO_4$ | | | | | | | |
| Quantity utilised (ppm) | — | 30 | 40 | 50 | 60 | 70 | 80 | 90 | 100 |
| Polyol component (b1) VP LS 2235 | 4000 | 4000 | 4000 | 4000 | 4000 | 4000 | 4000 | 4000 | 4000 |
| Surfynol ® 104 BC | 80 | 80 | 80 | 80 | 80 | 80 | 80 | 80 | 80 |
| Baysilone ® VP AI 3468, 10% | 68 | 68 | 68 | 68 | 68 | 68 | 68 | 68 | 68 |
| Borchigel ® PW 25 | 12 | 12 | 12 | 12 | 12 | 12 | 12 | 12 | 12 |
| Catalyst solution | — | 0.0241 | 0.0357 | 0.045 | 0.051 | 0.0443 | 0.0633 | 0.073 | 0.0614 |
| Base | | 110.8 | 123.1 | 124.5 | 117.5 | 87.5 | 109.3 | 109.5 | 84.8 |
| Component 1 | 85.5 | 85.6 | 85.6 | 85.6 | 85.6 | 85.6 | 85.6 | 85.6 | 84.9 |
| Polyisocyanate component (a1) Bayhydur ® VP LS 2319, 80% | 31.4 | 31.4 | 31.4 | 31.4 | 31.4 | 31.4 | 31.4 | 31.4 | 31.1 |
| Water | 32.5 | 37.1 | 32.7 | 39.6 | 34.9 | 34.8 | 32.5 | 33.5 | 32.8 |
| Efflux time(s) 4 mm DIN 53211/pH | 25/8.0 | 22/8.0 | 25/8.0 | 27/8.0 | 24/8.0 | 23/8.0 | 35/8.0 | 24/7.9 | 25/8.0 |
| after 1 h | 27/7.7 | 20/7.6 | 25/7.5 | 27/7.5 | 23/7.6 | 22/7.6 | 25/7.6 | 26/7.7 | 24/7.7 |
| after 2 h | 29/7.4 | 22/7.4 | 29/7.4 | 33/7.3 | 26/7.4 | 24/7.4 | 31/7.4 | 31/7.3 | 28/7.4 |
| after 3 h | 27/7.2 | 26/7.2 | 34/7.2 | 39/7.4 | 32/7.2 | 31/7.2 | 38/7.2 | 39/7.2 | 34/7.2 |
| T1 after h | 2.5 | 2 | 2 | 2 | 2 | 2 | 2 | 2 | 2 |
| T3 after h | >5 | >5 | >5 | >5 | >5 | >5 | >5 | >5 | >5 |
| Tests after 30 min. at 60° C. | | | | | | | | | |
| Drying | 2 | 1 | 1 | 1 | 1 | 1 | 1 | 0 | 0 |
| Pendulum hardness after 2 h (24°/44%) | 19 | 32 | 33 | 38 | 42 | 42 | 42 | 42 | 43 |
| after 1 d (25°/41%) | 91 | 75 | 91 | 93 | 90 | 86 | 99 | 106 | 94 |
| Water resistance (1 h) after 2 h | 3 | 3 | 3 | 3 | 3 | 3 | 3 | 3 | 3 |

|  | Comparison | Examples according to the invention |  |  |  |  |  |  |  |
|---|---|---|---|---|---|---|---|---|---|
| Catalyst | None | Rubidium molybdate $Rb_2MoO_4$ | | | | | | | |
| Quantity utilised (ppm) | — | 30 | 40 | 50 | 60 | 70 | 80 | 90 | 100 |
| Polyol component (b1) VP LS 2235 | 4000 | 4000 | 4000 | 4000 | 4000 | 4000 | 4000 | 4000 | 4000 |
| Surfynol ® 104 BC | 80 | 80 | 80 | 80 | 80 | 80 | 80 | 80 | 80 |
| Baysilone ® VP AI 3468, 10% | 68 | 68 | 68 | 68 | 68 | 68 | 68 | 68 | 68 |
| Borchigel ® PW 25 | 12 | 12 | 12 | 12 | 12 | 12 | 12 | 12 | 12 |
| Catalyst solution | — | 0.0278 | 0.272 | 0.0375 | 0.0385 | 0.0528 | 0.0564 | 0.709 | 0.0657 |
| Base | | 127.8 | 93.8 | 103.8 | 88.7 | 104.3 | 97.4 | 108.8 | 90.7 |
| Component 1 | 85.5 | 85.6 | 85.6 | 85.6 | 85.6 | 85.6 | 85.6 | 85.6 | 85.6 |
| Polyisocyanate component (a1) Bayhydur ® VP LS 2319, 80% | 31.4 | 31.4 | 31.4 | 31.4 | 31.4 | 31.4 | 31.4 | 31.4 | 31.4 |
| Water | 31.8 | 32.1 | 34.8 | 32.4 | 32.6 | 32.2 | 33.0 | 32.5 | 32.5 |
| efflux time(s) 4 mm DIN 53211/pH | 25/8.0 | 25/8.0 | 23/8.0 | 25/8.0 | 25/8.0 | 24/8.0 | 24/8.0 | 25/7.9 | 24/8.0 |
| after 1 h | 26/7.6 | 26/7.6 | 22/7.6 | 25/7.5 | 26/7.6 | 24/7.7 | 23/7.7 | 25/7.6 | 24/7.6 |
| after 2 h | 29/7.4 | 29/7.5 | 26/7.3 | 30/7.3 | 29/7.4 | 28/7.4 | 27/7.5 | 29/7.5 | 27/7.5 |
| after 3 h | 36/7.2 | 36/7.2 | 31/7.1 | 37/7.2 | 35/7.2 | 34/7.3 | 32/7.3 | 36/7.2 | 33/7.2 |
| T1 after h | 2.5 | 2 | 2 | 2 | 2 | 2 | 2 | 2 | 2 |
| T3 after h | >7 | >7 | >7 | >7 | 5 | >7 | 7 | 7 | 5 |
| Tests after 30 min. 60° C. | | | | | | | | | |
| Drying | 2 | 1 | 1 | 1 | 1 | 0 | 0 | 0 | 0 |
| Pendulum hardness after 2 h (27°/35%) | 16 | 33 | 45 | 45 | 49 | 58 | 67 | 67 | 62 |
| after 4 d (24°/41%) | 130 | 120 | 134 | 125 | 118 | 116 | 137 | 137 | 121 |
| Water resistance (1 h) after 2 h | 3 | 3 | 3 | 3 | 3 | 3 | 3 | 3 | 3 |

In Examples 3 and 4 a marked increase in the pendulum hardness of the lacquers, without impairment of pot life is shown with the catalysts sodium orthovanadate and rubidium molybdate. A range of catalyst concentrations is possible and leads to good results.

Example 4

Influence of lithium molybdate on selected lacquer properties in a water-based 2-K PU white lacquer. Lacquer composition:

|  | Comparison | Examples according to the invention | | |
|---|---|---|---|---|
| Component 1 | | | | |
| Polyol component (b1) Bayhydrol ® VP LS 2235[1] | 700.0 | 700.0 | 700.0 | 700.0 |
| Surfynol ® 104 BC[1] | 15.9 | 15.9 | 15.9 | 15.9 |
| Borchigel ® PW 25[2] | 2.1 | 2.1 | 2.1 | 2.1 |
| Baysilone ® VP AI 3468[3] | 13.2 | 13.2 | 13.2 | 13.2 |
| Surfynol ® SN 95[4] | 101.6 | 101.6 | 101.6 | 101.6 |
| Tronox ® R-KB 4[5] | 423.2 | 423.2 | 423.2 | 423.2 |
| Water for pigment dispersion | — | — | — | — |
| Total millbase | 1256.0 | 1256.0 | 1256.0 | 1256.0 |
| The catalyst (c) was added following the grinding operation. | | | | |
| Lithium molybdate (ppm) | — | 50 ppm | 100 ppm | 500 ppm |
|  | — | 0.5291 | 1.0582 | 5.2909 |
| Total component 1 | 1256.0 | 1256.5 | 1257.1 | 1261.3 |
| Component 2 | | | | |
| Polyisocyanate component (a1) Bayhydur ® VP LS 2319 (80% in methoxybutyl acetate) | 267.5 | 267.5 | 267.5 | 267.5 |
| Total component 1 + component 2 | 1523.5 | 1524.0 | 1524.6 | 1528.8 |
| Ratio by weight comp. 1:comp. 2 | 100:21.3 | 100:21.3 | 100:21.3 | 100:21.3 |
| $H_2O$ 25 sec. DIN 4 to 100.0 g | 32.3 | 32.3 | 32.3 | 32.3 |

[1] Air Products N.L., additive to improve flow, wet the substrate, suppress foam,
[2] Borchers GmbH, Monheim, PU thickener,
[3] Bayer AG, Leverkusen; flow promoter,
[4] Air Products N.L.,
[5] Kronos International INC, Leverkusen, pigment.

All the constituents of component 1 are mixed at approx. 2000 r.p.m. for 10 min. after which the Tronox® R-KB 4 is stirred in portion-wise, and pre-dispersion takes place at approx. 2000 r.p.m. for 10 min. Component 1 is then ground in a pearl mill at approx. 40° C. for 60 min. and is then left to degas for 1 day. Before application the catalyst, typically in the form of an approx. 10% solution, is added to the ready lacquer mixture and is then incorporated mechanically. The lacquer mixture is applied by knife.

TABLE 4

| | Results | | | |
|---|---|---|---|---|
| | Comparison | Examples according to the invention | | |
| Variation of the catalyst | No catalyst | 50 ppm | 100 ppm | 500 ppm |
| Viscosity/pH | | | | |
| immediately | 20/8.2 | 20/8.1 | 20/8.0 | 19/8.0 |
| 1 h | 20/7.9 | 20/7.8 | 20/7.8 | 19/7.7 |
| 2 h | 24/7.6 | 23/7.5 | 24/7.6 | 23/7.5 |
| 3 h | 29/7.0 | 28/7.1 | 28/7.1 | 27/7.1 |
| Gloss (20°) | 81 | 81 | 80 | 79 |
| Drying T1/T3 | 1.5/>6 | 1.5/>6 | 1.5/>6 | 1.5/6 |
| Pendulum hardness | | | | |
| immediately | 16 | 16 | 24 | 77 |
| 1 d RT | 66 | 66 | 84 | 97 |
| 3 d RT | 116 | 113 | 113 | 94 |
| 7 d RT | 123 | 132 | 136 | 109 |
| Chemical resistance (0 = good, 5 = poor) | | | | |
| Water (60') 30' 60° C. | | | | |
| immediately | 4 | 4 | 4 | 2 |
| 1 d RT | 3–4 | 3–4 | 1 | 1 |
| 3 d RT | 1 | 1 | 0 | 0 |
| 7 d RT | 0 | 0 | 0 | 0 |
| Super grade petrol (5') 30' 60° C. | | | | |
| immediately | 5 | 5 | 5 | 4 |
| 1 d RT | 4 | 4 | 4 | 2 |
| 3 d RT | 2 | 2 | 2 | 2 |
| 7 d RT | 1 | 1 | 1 | 1 |
| MPA (5') 30' 60° C. | | | | |
| immediately | 5 | 5 | 5 | 4 |
| 1 d RT | 4 | 4 | 4 | 2 |
| 3 d RT | 2 | 2 | 2 | 2 |
| 7 d RT | 1 | 1 | 1 | 1 |
| Xylene (5') 30' 60° C. | | | | |
| immediately | 5 | 5 | 5 | 4 |
| 1 d RT | 4 | 4 | 4 | 3 |
| 3 d RT | 2 | 2 | 2 | 2 |
| 7 d RT | 1 | 1 | 1 | 1 |

The Example demonstrates the improvement in solvent resistance brought about by use of the catalyst.

Example 5

Example of the influence of lithium molybdate on selected lacquer properties in a water-based 2-K PU white lacquer, with variation of the polyol components.

Lacquer Composition:

| | | |
|---|---|---|
| Component 1 | | |
| Polyol component (b2) PU/PAC polyol | 223.3 | |
| Polyol component (b3) PES polyol | | 324.2 |
| Lithium molybdate | 000.3476 (100 ppm) | 0.2418 (40 ppm) |
| Surfynol ® 104[1] | 5.2 | 9.1 |
| Borchigel ® PW 25[2] | 0.7 | 1.2 |
| Baysilone ® VP AI 3468[3] | 4.3 | 7.6 |
| Total component 1 | 302.2 | 342.3 |
| Component 1 | | |
| Component 2 | | |
| Polyisocyanate component (a1): Bayhydur ® VP LS 2319[5] (80% in methoxybutyl acetate) | 104.5 | 161.9 |
| Total comp. 1 + comp. 2 | 406.7 | 504.2 |
| Ratio by weight comp. 1:comp. 2 | 100:34.6 | 100:47.3 |

[1]Air Products N.L., additive to improve flow, wet the substrate, suppress foam,
[2]Borchers GmbH, Monheim, PU thickener,
[3]Borchers GmbH, Monheim, slip additive,
[4]Hydrophilised hexamethylene diisocyanate trimer, Bayer AG, Leverkusen These are Examples with so-called polyurethane-polyacrylate polyols (PU-PAC) or polyester polyols (PES). The method of preparation of the clear coat lacquers is identical to that described in Example 1.

TABLE 5

Improvement in the properties of a water-based 2-K PU clear coat lacquer as a result of the addition of lithium molybdate to different polyols

| | Comparison | Acc. to the invention | Comparison | Acc. to the invention |
|---|---|---|---|---|
| Variation of the catalyst | No catalyst | 100 ppm | No catalyst | 40 ppm |
| Binder type | PU/PAC | PU/PAC | PES | PES |
| Viscosity/pH | | | | |
| immediately | 20/7.7 | 18/7.6 | 24"/7.1 | 24"/7.0 |
| 1 h | 24/7.4 | 20/7.1 | 28"/7.0 | 28"/6.8 |
| 2 h | 29/7.2 | 29/6.9 | 30"/6.9 | 39"/6.8 |
| 3 h | 37/6.7 | 36/6.6 | 32"/6.7 | 32"/6.6 |
| Gloss (20°) | 85 | 79 | 82 | 88 |
| Haze | — | — | 62 | 62 |
| Drying T1/T3 | 1.5/>6 | 1.5/>6 | 3.0/>6 | 2.5/>6 |

TABLE 5-continued

Improvement in the properties of a water-based 2-K PU clear coat lacquer as a result of the addition of lithium molybdate to different polyols

|  | Comparison | Acc. to the invention | Comparison | Acc. to the invention |
|---|---|---|---|---|
| Pendulum hardness | | | | |
| immediately | 16 | 87 | 178 | 200 |
| 1 d RT | 24 | 145 | 207 | 210 |
| 3 d RT | 119 | 157 | 211 | 202 |
| 7 d RT | 181 | 169 | 213 | 209 |
| Chemical resistance (0 = good, 5 = poor) | | | | |
| Water (60') 30' 60° C. | | | | |
| immediately | 4 | 2 | 1 | 1 |
| 1 d RT | 1 | 1 | 1 | 1 |
| 3 d RT | 1 | 0 | 1 | 1 |
| 7 d RT | 0 | 0 | 0 | 1 |
| Super grade petrol (5') 30' 60° C. | | | | |
| immediately | 5 | 4 | 2 | 2 |
| 1 d RT | 3 | 4 | 1 | 1 |
| 3 d RT | 3 | 2 | 1 | 1 |
| 7 d RT | 2 | 1 | 0 | 0 |
| MPA (5') 30' 60° C. | | | | |
| immediately | 5 | 4 | 3 | 3 |
| 1 d RT | 5 | 4 | 2 | 2 |
| 3 d RT | 2 | 2 | 1 | 1 |
| 7 d RT | 1 | 1 | 0 | 0 |
| Xylene (5') 30' 60° C. | | | | |
| immediately | 5 | 4 | 2 | 2 |
| 1 d RT | 5 | 4 | 1 | 1 |
| 3 d RT | 3 | 1 | 1 | 1 |
| 7 d RT | 1 | 1 | 0 | 0 |

Here also rapid curing and improved chemical resistance are already achieved after a very short time as a result of use of the catalyst.

Example 6

The following Example explains the acceleration of the curing of water-based 2-component polyurethane systems for floor coatings. In the Example the curing times of coatings are reduced markedly, such that the end properties are already achieved after 3 days instead of after 7 days. After one day the catalysed system shows double the pendulum hardness of the uncatalysed system.

| | Parts by weight |
|---|---|
| Component 1: | |
| Polyol (b4) Bayhydrol ® XP 2457 | 59.54 |
| Drewplus ® T-4201 (degassing additive, Ashland Chemicals) | 1.00 |
| Hydropalat ® 140 (flow additive, Cognis GmbH) | 0.7 |
| Ultralube ® D-818 (wax, from Keim Additec) | 4.75 |
| Water | 26.71 |
| Ceraflour ® 920 (flatting agent, from Byk Chemie) | 4.4 |
| DSX 1514 (8% in water) (rheological additive, Cognis GmbH) | 2.4 |
| Diethylene glycol | 0.5 |
| Total | 100.00 |

The formulation constituents of component 1 are dispersed in a dissolver at approx. 5 m/s for approx. 10–15 minutes.

| -continued | |
|---|---|
| | Parts by weight |
| Component 2: | |
| Bayhydur ® XP 2451, undiluted (polyisocyanate a3) | 9.71 |
| Sum total | 109.71 |
| Composition of the lacquer system: | |
| Binder | 31.56 |
| Flatting agent | 4.01 |
| Water | 60.98 |
| Additives | 3.45 |
| Total | 100.00 |
| Mixing ratio component 1:component 2 (parts by weight) | 100:9.71 |

Components 1 and 2 are mixed until homogeneous before processing. For the purpose of homogeneous mixing of components 1 and 2, 0.5 g of a 1% lithium molybdate solution are added. The mixture is knife coated onto a primed steel plate. It is compared with a mixture to which no catalyst has been added.

Results:

| Sample: | Pendulum hardness after | | | | |
|---|---|---|---|---|---|
| | 1 d | 3 d | 7 d | 14 d | (d = day) |
| Lacquer system with no Li molybdate | 21 s | 56 s | 60 s | 75 s | (Comparison) |
| Lacquer system with Li molybdate | 38 s | 65 s | 75 s | 74 s | (acc. to invention) |

It is particularly noticeable that, for example, foot traffic is possible on the catalysed lacquer system after only one day, but not on the non-catalysed system.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component polyurethane coating system comprising
   (a) a polyisocyanate which is optionally hydrophilically modified,
   (b) a compound which
      I) has groups which are reactive with isocyanates,
      Ii) is optionally hydrophilically modified, and
      Iii) is dissolved or dispersed in water, optionally in the presence of an organic solvent or solvent mixture,
   (c) one or more compounds of an element of group v or group vi of the periodic table, in which the element in each case has an oxidation state of at least +4, and
   (d) optionally an additive or an auxiliary agent,
   Wherein the quantities of (a)+(b) are from 20 to 99.9999 parts by weight, the quantity of (c) is from 0.0001 to 5 parts by weight, and the quantity of (d) is from 0 to 75 parts by weight, with the proviso that the sum of the parts by weight (a) to (d) is 100.

2. The coating system of claim 1 wherein component (c) comprises a compound of an element selected from the group consisting of vanadium, tantalum, molybdenum, tungsten and tellurium.

3. The coating system of claim 1 wherein component (c) comprises one or more compounds selected from the group consisting of molybdic acid, lithium molybdate, sodium molybdate, potassium molybdate, rubidium molybdate, cesium molybdate, tetramethylammonium molybdate, tetraethyl-ammonium molybdate, molybdenyl acetylacetonate, molybdenum dioxide tetramethylheptadionate, sodium tungstate, potassium tellurite $K_2TeO_3$, lithium orthovanadate, lithium metavanadate, sodium orthovanadate, sodium metavanadate and ammonium heptamolybdate.

4. The coating system of claim 1 wherein the system is a lacquer system.

5. The coating system of claim 1 wherein the system is a water-based lacquer system.

6. The coating system of claim 1 wherein the system is an adhesive system.

7. The coating system of claim 1, wherein polyisocyanate (a) comprises a polyisocyanate having aliphatically bound isocyanate groups.

8. The coating system of claim 1 wherein polyisocyanate (a) comprises blocked polyisocyanates having aromatically bound isocyanate groups.

9. The coating system of claim 1 wherein polyisocyanate (a) is based on one or more of hexamethylene diisocyanate, isophorone diisocyanate; and 4,4'-diisocyanatodicyclohexyl methane.

10. The coating system of claim 1 wherein polyisocyanate (a) is hydrophilically modified.

11. The coating system of claim 1 wherein component (c) comprises a salt of molybdic acid or a condensation product thereof.

12. The coating system of claim 1 wherein component (c) comprises lithium molybdate, sodium molybdate or potassium molybdate.

13. The coating system of claim 1 wherein component (c) comprises a salt of vanadic acid or a condensation products thereof.

14. The coating system of claim 1 wherein component (c) comprises lithium vanadate, sodium vanadate, potassium vanadate or the corresponding respective orthovanadates.

15. A process for preparing the coating system of claim 1 comprising introducing component (c) into component (a) during the preparation of component (a) or introducing component (c) into component (b) during the preparation of component (b).

16. A process for preparing the coating system of claim 1 comprising introducing component (c) into a mixture comprising component (a) and component (b).

17. A process for preparing the coating system of claim 1 comprising adding component (c) to one or more components before the addition of additional water or solvent.

18. A lacquer, paint or adhesive prepared by the process of claim 15.

19. A substrate coated with the coating system of claim 1.

20. The coating system of claim 2 wherein component (c) comprises one or more compounds selected from the group consisting of molybdic acid, lithium molybdate, sodium molybdate, potassium molybdate, rubidium molybdate, cesium molybdate, tetramethylammonium molybdate, tetraethyl-ammonium molybdate, molybdenyl acetylacetonate, molybdenum dioxide tetra-methylheptadionate, sodium tungstate, potassium tellurite $K_2TeO_3$, lithium orthovanadate, lithium metavanadate, sodium orthovanadate, sodium metavanadate and ammonium heptamolybdate.

* * * * *